Jan. 28, 1958

F. H. NICOLL 2,821,109

SPHERICAL REFLECTING OPTICAL SYSTEM HAVING
A NON-PLANAR CORRECTING PLATE
Filed Sept. 30, 1952

INVENTOR.
FREDERICK H. NICOLL
BY
ATTORNEY

# United States Patent Office 2,821,109
Patented Jan. 28, 1958

2,821,109

SPHERICAL REFLECTING OPTICAL SYSTEM HAVING A NON-PLANAR CORRECTING PLATE

Frederick H. Nicoll, Princeton, N. J., assignor to Radio Corporation of America, a corporation of Delaware Application September 30, 1952, Serial No. 312,297

7 Claims. (Cl. 88—57)

The present invention relates to an optical system which is applicable, but not limited, to a projection system for television receivers.

More particularly, the invention relates to an optical projection system which provides better contrast and improved definition than has been possible heretofore.

In conventional optical systems of this type, as applied to television image projection, light emanating from the face of a cathode ray tube located near the focal point of a spherical reflector strikes the reflector and then passes rearwardly. A correcting plate having an aspherical surface and a plane surface is ordinarily located at the center of curvature of the spherical reflector and has as its function that of correcting for error such as spherical aberration and the like which is introduced into the system by the spherical mirror. While the system has been shown to be well suited to the task of projecting the image of a television kinescope onto a screen located some distance therefrom, it has been found, and persons skilled in the art will appreciate, that substantially 8 to 10% of the light which reaches the correcting plate at right angles from the spherical mirror is reflected by the correcting plate. Such reflected light will ordinarily, in the conventional system, return to the spherical reflector and back to the face of the kinescope, thus impairing the contrast of the projected image. Further, the percentage of light reflected is greater for non-normal incident light than the 8–10% mentioned. The degree to which this reflected light detracts from the definition or contrast of the observed image depends, of course, upon the resolution of the image in the absence of such unwanted reflected light. That is to say, the undesirable effect of the light which is reflected back into the system by the surface of the correcting plate will be greater in a case wherein the system is capable of high contrast and fine resolution.

Various attempts have been made in an effort to eliminate total reflection of light in the region of the face of the kinescope in a Schmidt system and an example of one such effort which has proved successful is the provision of an antihalation lens. While these improvements on the system have accomplished their stated aims, prior workers in the art apparently have not recognized the undesirable reflection of light by the surfaces of the correcting plate itself.

It is, therefore, a primary object of the present invention to provide means for eliminating, the reflection of light from the surfaces of the correcting plate back to the spherical mirror and kinescope face.

In general, the invention contemplates the "dishing" of the correcting plate either toward or away from the spherical reflector or forming the plate in a generally frusto-conical shape so that light which may be reflected by the correcting plate will not return to the reflector and thence to the object where it can impair the resolution of the image. More particularly, the invention takes advantage of the fact that the outer surface of a kinescope tube is usually blackened and that the optical system itself is ordinarily housed in a blackened box. Thus the "dishing" or frusto-conical shape of the correcting plate results in its reflecting light either toward the blackened surface of the kinescope or to the blackened interior of the housing, depending upon the direction in which the plate is "dished" or the direction of its "apex." In either case, the reflected light is absorbed by the black surface and does not return to the spherical reflector as in the prior art.

It is a further object of the present invention, therefore, to provide, a correcting plate which is dished toward the spherical reflector so that light reflected by the surface of the plate will be absorbed by the back of the kinescope.

Another object of the invention is to provide a correcting plate which is dished away from the spherical reflector so that the plate will reflect light to the absorbing surface of the housing of the optical system.

Further objects and advantages of the present invention will become apparent to persons skilled in the art from a study of the following detailed description of the drawings in which.

Figure 1:
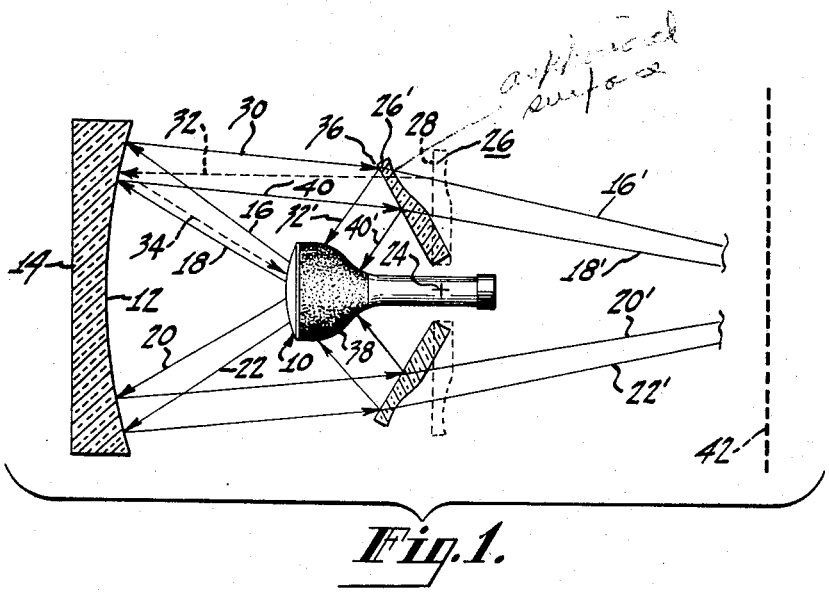
Fig. 1 illustrates one form of the present invention.

Referring to the drawings and, more particularly, to Fig. 1 thereof, reference numeral 10 indicates generally a television receiving picture tube or kinescope which may have a phosphor coating on the interior surface of its face (not shown) such that bombardment of the coating by an electron beam in the usual manner will cause the phosphor to emit light. The light thus produced by the kinescope travels toward reflecting surface 12 of the spherical mirror 14 along paths indicated at 16, 18, 20 and 22. It will be appreciated, of course, that each spot of light on the face of the kinescope 10 will produce a "bundle" or cone of light rays and that the four rays illustrated in the drawing are shown merely by way of example of certain of the principal rays of light.

A correcting plate shown in dotted lines at 26 is disposed at the center of curvature 24 of the spherical mirror 14. Ordinarily, the surface 28 of the plate which is nearer the reflecting surface 12 is planar, while the other face of the correcting plate is provided with an aspherical configuration calculated to compensate for spherical aberration introduced into the system by the spherical surface 12. It will thus be seen that, with a correcting plate such as is denoted at 26, some of the light striking surface 28 thereof as, for example, ray 30 will be reflected back to the surface 12 along line 32 and will be caused to return to the face of the kinescope, following a path indicated at 34. Such unwanted, reflected light serves to detract from the contrast of the image as will be understood by workers in the art.

The present invention, according to the form shown in Fig. 1 involves the formation of the correcting plate 26' (shown in solid lines) such that it is generally frusto-conical, with the base of the "cone" being nearer the reflecting surface 12. In the drawing, the shape of the reflecting plate is substantially exaggerated merely for purposes of rendering the drawing more readily understandable. In the usual case, of course, the amount which the correcting plate 26' departs from the substantially planar shape shown in dotted lines at 26 depends upon such factors as the size of the tube and the amount of "throw" (which is a function of the radius of curvature of the spherical mirror) as will appear more fully. With the correcting plate 26' in position, it will be seen that light ray 30, for example, which strikes the correcting plate at point 36 will be reflected downwardly at an angle equal to the angle of incidence along path 32' to the usually blackened surface 38 of the kinescope tube where it will be absorbed. Light ray 18 will travel from the face of the kinescope 10 to the reflecting surface 12 of the spherical mirror and will be reflected thereby along path 40 to the correcting plate 26'. That portion of the light which is reflected by the correcting plate 26' will travel along path 40' to the blackened surface of tube 38 and will not be returned to the system. Similarly, light rays 20 and 22 will be caused to travel to the correcting plate 26' and those percentages of these two rays which are reflected by the plate will also be directed to the absorbing surface of kinescope 28.

In order to round out the operation of the system, it is seen that that portion of the incident light rays which reaches the correcting plate 26' and which is not reflected thereby will travel along lines 16', 18', 20' and 22' to a screen 42, in the usual manner.

According to the invention as thus far described, it is apparent that the correcting plate 26', by virtue of its being nonplanar and, more specifically in the instance illustrated, frusto-conical, with the base of the "cone" toward the spherical reflector 12, will not serve to reflect any incident light back into the system but will, on the other hand, cause such reflected light to travel along harmless paths to a light absorbing surface, namely, the blackened portion of the kinescope 10, which, for all practical purposes, is "outside" of the optical system.

Figure 2:
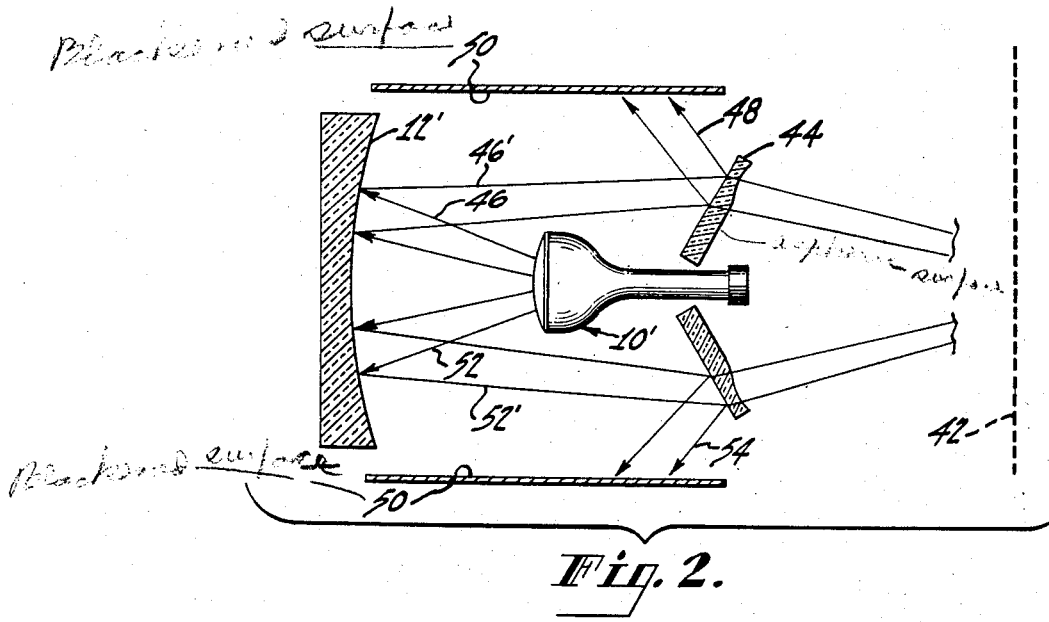
Fig. 2 illustrates another form of the invention.

In the form of the invention illustrated by Fig. 2 the correcting plate 44 is again frusto-conical, with its "base" away from the spherical reflecting surface 12'. Otherwise, the system shown is substantially the same as that of Fig. 1. The operation of the system of Fig. 2 will be understood by following the path of a single principal light ray indicated at 46 which travels from the face of the kinescope 10' to the mirror 12', from which it is reflected along path 46' to the correcting plate 44. Since the reflecting plate is frusto-conical as shown, that portion of light ray 46' which is reflected by the correcting plate 44 will travel outwardly along path 48 to the blackened surface 50 which may constitute a part of the housing for the system. In substantially the same manner, light ray 52 will be reflected by mirror 12' along path 52' to the correcting plate and light reflected by the latter will travel in the direction shown at 54 to another part of the housing 50 where it will be absorbed.

While the invention as illustrated in Figs. 1 and 2 has taken the form of a generally frusto-conical correcting plate, it will be appreciated by persons skilled in the art that the same effect may be realized by merely dishing the correcting plate so that it is either convex or concave with respect to the mirror in an amount sufficient to cause any reflected light to travel either toward the housing of the system or to the blackened surface of the kinescope. Those skilled in the art will also understand that the configuration of the aspherical surface of the correcting plate may be calculated in the usual manner, taking into account the fact that the plate is not planar but is either frusto-conical or "dished".

Further modifications of the forms shown to illustrate the invention will suggest themselves to persons skilled in the art and are within the scope of the appended claims.

Having thus described my invention, what I claim as new and desire to secure by Letters Patent is:

1. An optical system comprising a spherical reflecting member and a non-planar correcting plate positioned coaxially with respect to said reflector, said correcting plate being generally frusto-conical in shape and having an aspherical surface located at substantially the center of curvature of said reflector and on the axis of said optical system and wherein the frusto-coincal surface of said correcting plate describes an angle with respect to a plane perpendicular to the axis of said reflector of such magnitude that light rays reflected by said spherical mirror strike said plate at an acute angle so that light rays reflected by said plate are directed toward a light-absorbing surface positioned outside of the projection beam whereby the reflected light from the aspherical correcting member does not return to the spherical reflector.

2. An optical system comprising a spherical reflecting member and a non-planar aspherical correcting plate positioned coaxially with respect to said spherical reflecting member and at substantially its center of curvature, such corrector plate being of generally frusto-conical shape and with the apex of its generally conical surface on the axis of the optical system and with the angle of said conical surface divergent from a plane normal to the optical axis such that light reflected to said corrector plate by said spherical reflecting member has an acute angle of incidence with respect to said corrector plate such that light reflected by said corrector plate is directed away from said spherical reflecting member to a light-absorbing surface.

3. An optical system as defined by claim 2 wherein said correcting plate is dished toward said spherical reflector whereby light reflected by said plate is caused to travel toward a point located outside the effective optical paths of said system.

4. An optical system as defined by claim 2 wherein said correcting plate is dished away from said spherical reflector, whereby light reflected by said plate is caused to travel beyond the operative limits of said reflector.

5. An optical system as defined by claim 2 wherein said correcting plate is generally frusto-conical such that its apex is directed away form said reflector, whereby light reflected by said plate is directed toward a point located beyond the focal point of said reflector.

6. An optical system as defined by claim 2 wherein said spherical member is a section of a sphere and wherein said correcting plate is generally frusto-conical with its apex directed toward said reflector, whereby light reflected by said plate directed toward a point beyond the periphery of said reflector.

7. An optical system as defined by claim 2 including a cathode ray tube as a light source, said light-absorbing surface being on the shell of said tube.

References Cited in the file of this patent

UNITED STATES PATENTS

| | | |
|---|---|---|
| 2,170,979 | Straubel | Aug. 29, 1939 |
| 2,273,801 | Landis | Feb. 17, 1942 |
| 2,295,802 | Nicoll | Sept. 15, 1942 |
| 2,403,660 | Hayward | July 9, 1946 |
| 2,454,144 | Epstein | Nov. 16, 1948 |
| 2,470,198 | Traub | May 17, 1949 |
| 2,477,331 | Epstein | July 26, 1949 |
| 2,510,521 | Rinia | June 6, 1950 |
| 2,518,067 | Rinia | Aug. 8, 1950 |

FOREIGN PATENTS

| | | |
|---|---|---|
| 976,400 | France | Oct. 25, 1950 |